March 25, 1958  A. A. RIBAUDO ET AL  2,827,893
FURNACE SYSTEM FOR HEATING AIR AND WATER
Filed Jan. 28, 1955  3 Sheets-Sheet 2
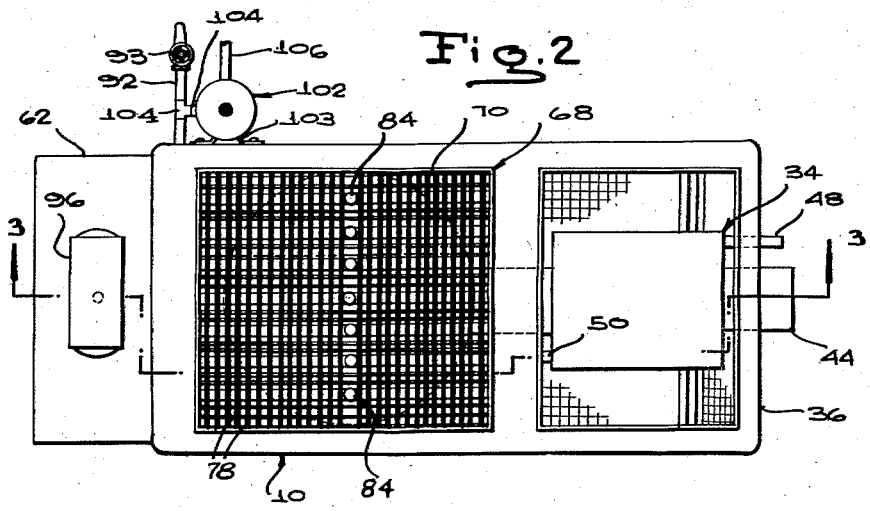
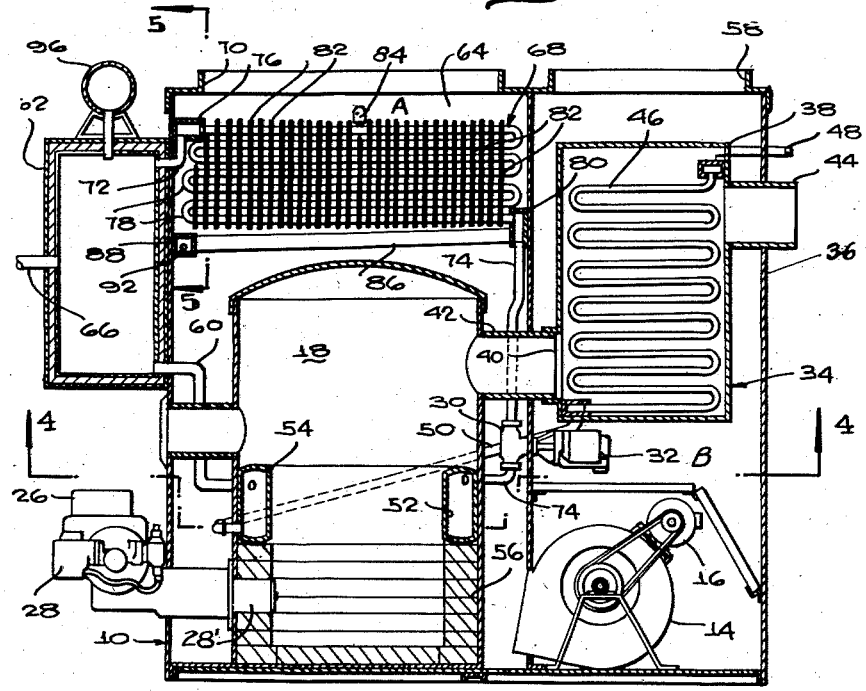
INVENTORS
RALPH P. CLAUSEN, STANLEY NOSTER
& ANDREW A. RIBAUDO
BY
McMorrow, Berman & Davidson
ATTORNEYS

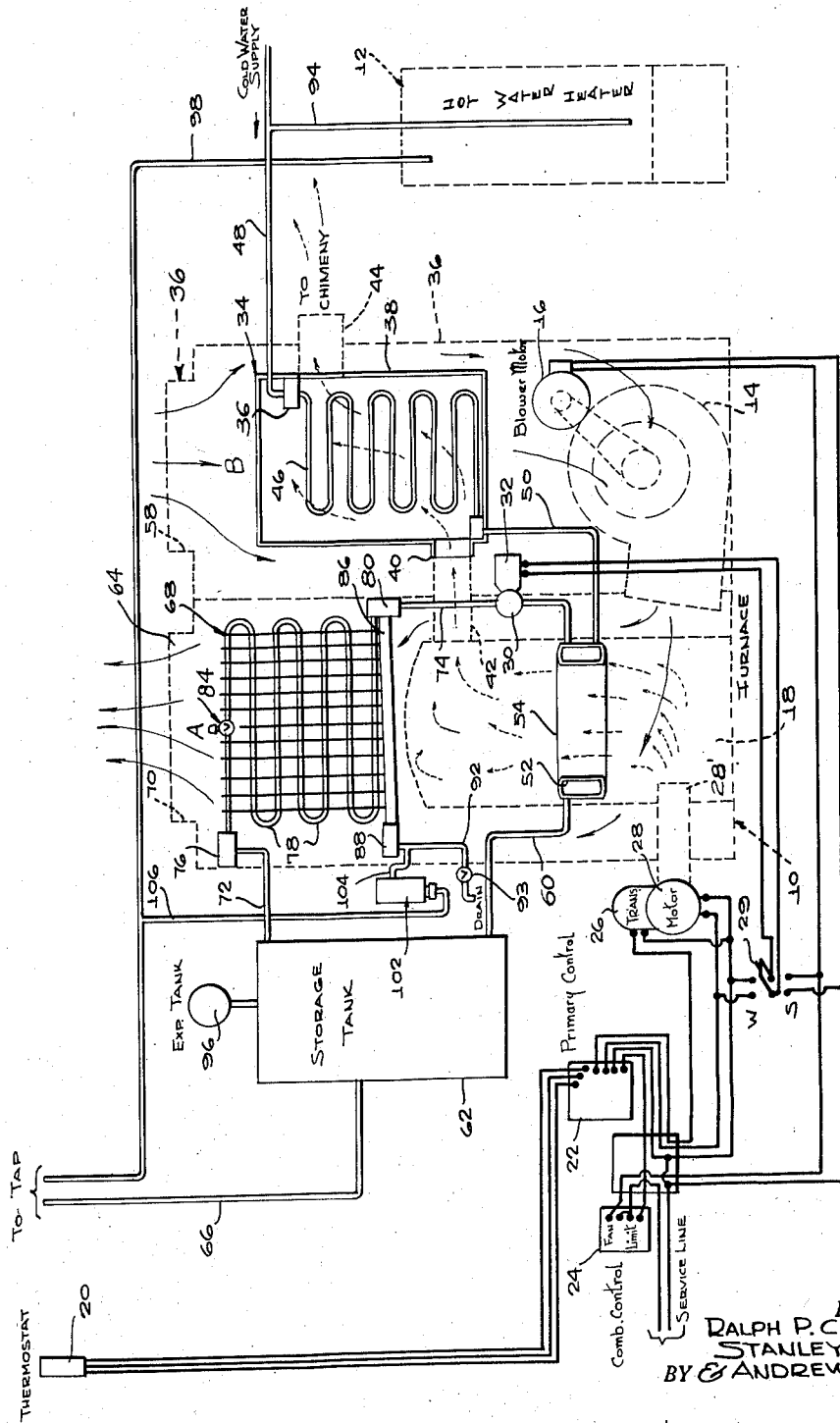

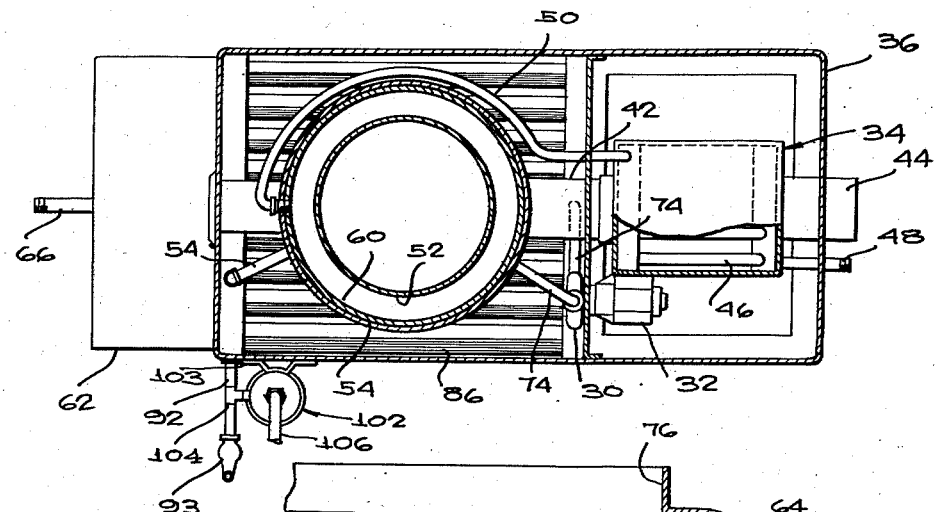
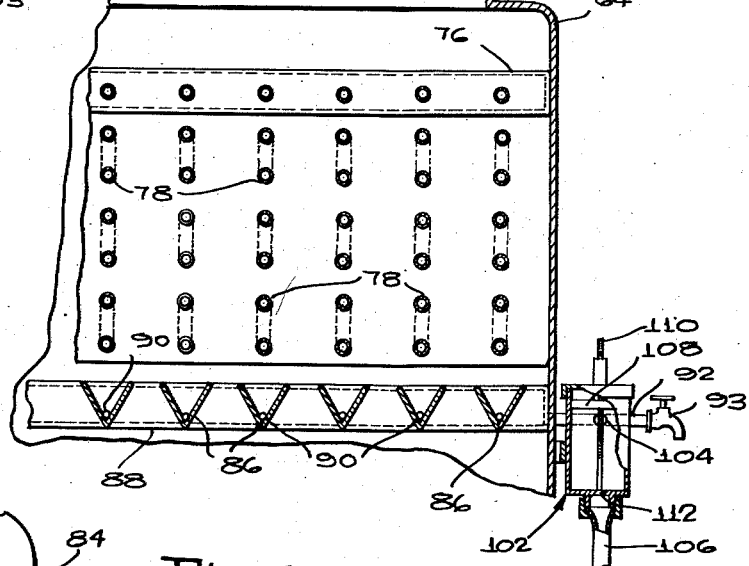
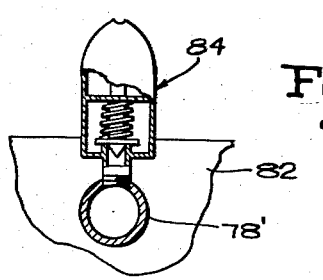

United States Patent Office 2,827,893
Patented Mar. 25, 1958

2,827,893

FURNACE SYSTEM FOR HEATING AIR AND WATER

Andrew A. Ribaudo and Stanley Noster, Brooklyn, and Ralph P. Clausen, Westbury, N. Y.

Application January 28, 1955, Serial No. 484,704

2 Claims. (Cl. 126—101)

This invention relates to an improved air heating, cooling, and conditioning system, especially but not exclusively, for use with domestic forced hot air furnace systems.

It is an object of this invention to provide a self-contained system of this kind, which can be associated with ordinary forced air domestic furnaces without extensive alteration thereof, and which includes means providing an adequate supply of hot water for domestic and other uses, without employing the usual separate hot water heater.

It is a further object of this invention to provide a system of the kind indicated above which is unusually efficient, reliable, and economical in operation, and which eliminates cyclical variations in the supply of heated or cooled air to the spaces to be heated or cooled and maintains constant temperatures therein.

Another and further object of this invention is to provide a system of this type whose initial cost is far lower than that of present systems which include both air heating and cooling means, and which utilizes the continuous flow fan principle of lower temperature air to produce even distribution of heated or cooled air, so as to obtain a far greater degree of comfort throughout an entire dwelling.

Other objects and advantages will become apparent from the following detailed description, forming the specification, and taken in conjunction with the accompanying drawings, in which:

Figure 1 is a diagrammatic view of a system embodying this invention;

Figure 2 is a top plan view of Figure 1;

Figure 3 is a vertical longitudinal cross sectional view taken substantially along line 3—3 of Figure 2 and looking in the direction of the arrows;

Figure 4 is a horizontal cross sectional view, partially in elevation with portions of the parts in elevation broken away, taken along line 4—4 of Figure 3;

Figure 5 is a fragmentary transverse vertical cross sectional view taken along line 5—5 of Figure 3, on a somewhat enlarged scale; and Figure 6 is an enlarged view of the steam escape valve.

With continued reference to the drawings, there is diagrammatically illustrated in Figure 1 a portion of a domestic hot water and air heating system which includes ducts (not shown) for conveying the air to different areas or spaces, and a furnace, generally indicated at 10, of the low-boy type, which may be either gas-fired or oil-fired, and a separate hot water heater, generally indicated at 12, which may be of the gas or electric type and of any desired capacity.

The furnace 10 comprises a housing 36 which is partitioned to provide, Figures 1 and 3, a main air heating compartment A and an air preheating compartment B. The furnace 10 is provided with a blower means or blower 14 driven by an electric motor 16 for forcing air from the air preheating compartment B to the main air heating compartment A. A firebox or pot 18 is located within the main air heating compartment A.

A conventional type of thermostatically controlled electrical circuit is shown in Figure 1 which includes a thermostat 20 mounted at a convenient location and connected to a primary control panel 22 which is in turn connected to a conventional bonnet switch 24 which is responsive to the temperature of the hot air outlet of the furnace so as to determine operation of the burner in the fire box 18 through the transformer 26 and the blower motor 28. The bonnet switch 24 may be operated so that the fan or blower 14 operates without regard to temperature control, with the burner motor 28 cut out of the circuit.

A water circulating pump, indicated at 30, is driven by a motor 32 connected into the electrical circuit by a winter-summer switch 29, as shown in Figure 1.

The illustrated system includes an economizer generally indicated at 34 which is positioned within the air preheating compartment B. The economizer 34 includes a closed casing 38 interposed in the flue line of the furnace and provided with an inlet opening 40 receiving a conduit 42 leading from the interior of the fire box of the furnace so that exhaust gases and other products of combustion of the furnace may pass from the furnace through the casing 38 and are discharged therefrom through the flue pipe 44 to a flue or chimney. A plurality of water preheating pipe coils 46 are disposed within the casing 38 and have their upper end connected to a cold water supply pipe 48 through which water flows from a cold water supply.

The lower ends of the water preheating coils 46 are connected to a pipe 50 which leads into the interior 52 of a water jacket 54 which is in the form of a toric body and is disposed within the furnace fire box 18 above the burner 28' thereof and may be supported upon fire brick 56 or other similar fire-resistant material.

It will be noted that the air preheating compartment B is provided with a return air inlet which is adapted to be connected to the outlet of the distributing duct system. Specifically, said inlet takes the form of an opening 58 formed in the top of the furnace housing 36 and receives air entering therethrough in the direction of the arrows in Figure 1, will be preheated by contact with the casing 38 and the housing 36.

A water pipe 60 is connected between the water jacket 54 and the lower end of an insulated water storage tank 62 mounted outside of the furnace and adjacent the upper end of the furnace. The water tank 62 is secured to the wall of the furnace housing 36 by any suitable means. A water tap line 66 leads from the interior of the storage tank 62 to the water system of the house whereby water from the storage tank may be withdrawn through conventional taps or other similar devices. A heat exchanger, generally indicated at 68, is disposed within the portion 64 of the main air heating compartment A above the water jacket 54 and in the path of upward movement of the heated air flowing through the main compartment A and out through the outlet opening 70 in the top of the main compartment A, the opening 70 being formed in the top of the furnace housing 36 and adapted to be connected to the inlet of a distributing duct system normally associated with this type of furnace installation, for carrying air to different areas or spaces of the dwelling, and returning the air through the top opening 58 in the casing 36.

The heat exchanger 68 comprises an upper header 76 from which a pipe 72 leads into the tank 62, and to which are connected the upper convolutions of a plurality of vertical coils 78, and whose bottom convolutions are connected to a lower header 80 disposed at the opposite side of the heat exchanger 68 from the side at which the header 76 is disposed. Thus, water flowing into the top header 76 of the heat exchanger 68 will circulate downwardly through the coils 78 and enter the lower header 80, as a part of the hot water circulation system of the furnace. The convolutions of the coils 78 are maintained in their vertically spaced relation and supported upon a plurality of spaced vertical fins 82, which are closely spaced and act as baffles to get the maximum efficiency from the heat exchanger 68 by directing the maximum amount of air over the coils 78. Each of the coils 78 is provided in its top convolutions 78' (Figure 6) with a steam escape valve, generally indicated at 84, of the type which will open at a predetermined pressure to permit escape of steam formed in the coils 78. The steam thus escaping is introduced into the stream of air forced through the furnace by operation of the blower 14 so that the air delivered through the duct system will be humidified, in contrast to the dry air normally delivered by similar forced air heating systems.

A plurality of V-shaped troughs 86 (Figure 5) are disposed in laterally spaced relation longitudinally of and below the coils 78 of the heat exchanger 68 in alignment with respective ones of the coils 78. The troughs 86 also define by their outer diverging surfaces guides for the air flowing through the furnace whereby the air will be directed through the spaces between adjacent troughs into the spaces between the coils 78 and between the fins 82 whereby the maximum heat exchange will be insured in the heat exchanger 68.

The troughs 86 decline away from the lower header 80 and drain into a common conduit 88, and the common conduit 88 is provided with openings 90 which communicate with the respective ones of the troughs 86 adjacent the apices thereof. The purpose of this construction will presently appear. The common conduit 88 is provided with a drain pipe 92 having therein a manual drain valve 93.

Adjacent the common conduit 88, the drain pipe 92 is connected by a pipe 104 at a point between the valve 93 and the common conduit 88 with a water level control tank, generally indicated at 102, carried by the furnace on a bracket 103. A vertical pipe 106 is tapped at its upper end into the tap line 98 and has its lower end connected into the lower end of the tank 102.

As shown in Figure 5, the water level control tank 102 is provided with a float 108 which is vertically adjustable by screw threaded means 110 so that a predetermined level of water may be maintained in the tank.

The tank 102 is further provided with a valve 112 responsive to the action of the float 108 to open and close and permit water to flow from the pipe 106 into the interior of the tank as water is withdrawn therefrom and is fed into the common conduit 88 and thence into the troughs 86 through the openings 90. This latter action will take place when the valve 93 is shut to make the drain inoperative so that the water will flow back through the pipe 104 into the common conduit 88 and thence to the troughs 86.

In winter operation, that is with the furnace hooked up for operation through the normal operation of the combination control 24, the cold water supply line 48 which has a pipe 94 branching therefrom into the hot water heater 12, will deliver cold water to the hot water heater which has been shut off for the winter operation. The water from the cold water supply will enter the coils 46 of the economizer 34 so as to be preheated therein and pass thence through the pipe 50 into the water jacket 54 to be circulated as above described. The water circulating through the water jacket 54, storage tank 62, and heat exchanger 68 is continuously heated by operation of the furnace 10. The storage tank 62, which may be of any desired size, is constantly filled with a supply of hot water. In the event that the temperature of the water rises to a point that expansion in the circulation system is necessary, the excess or expansion will be taken up in the expansion tank 96 mounted on tank 62 and in communication with the interior thereof. As hot water is drawn off through the tap line 66, this water will be replaced from the cold water supply line 48 to the extent it has been withdrawn.

Also, in winter operation, the drain valve 93 is closed so that water will be fed into the troughs 86 through the water level control tank 102, with the float 108 in the tank so adjusted that the level of the water in the troughs will not overflow the sides of the troughs. This will provide a constant source of water to the troughs. The water in the troughs is heated by the furnace and this provides moisture for the air as it passes through the heat exchanger 68. This, the air delivered to the various areas or spaces of the dwelling is humidified.

Also, it will be noted that the double throw, double pole summer-winter switch 29 is to be moved to connect the circulating pump motor 32 into the circuit operating the burner motor 28 for operation of the furnace, this position of the switch 29 being indicated in Figure 1 at W. Conversely, the switch 29 is to be moved to the position thereof indicated at S when the system is placed in operation for summer use so that the circulator motor 32 will operate when the blower 14 is in operation. Hence, the circulator pump 30 will be operative whenever the furnace is in operation in winter use, and whenever the blower is in operation for summer use.

Hence, it will be apparent that with a device or system in accordance with this invention associated with a hot air circulating furnace and air duct system of a dwelling, the usual separate hot water heater 12 is cut out of the system and its use rendered unnecessary, so that a saving in the cost of operation of the hot water heater for winter operations is made. In addition to the continuous supply of hot water supplied by the system of the present invention, the hot air for heating the dwelling will be humidified as it enters the duct system so that a more healthful supply of heat is delivered, which is especially important during the winter months.

For summer operation, the hot water heater 12 is put into operation to deliver hot water through the hot water tap line 98 so as to deliver hot water to the selected taps located at different points in the dwelling. Also, the valve 93 will be opened, the float in tank 102 adjusted to prevent water from entering pipe 104, and switch 29 moved from position W to position S.

Therefore, when the system is set for summer operation, the furnace is rendered inoperative by movement of the control switch 24 so that only the fan or blower 14 will be in continuous operation, unless shut off, and cold water will flow through the economizer 34 and into the water circulation system which includes the water jacket 54, storage tanks 62 and heat exchanger 68.

The water in this circulation system will be cooler than the surrounding air in the furnace during the summer months, and the heat of the air will be extracted therefrom by the colder temperatured water flowing through the heat exchanger coils as the air is forced past the coils by action of the blower 14. This will cause condensation upon the coils, and this condensation will form drops which will accumulate in the various troughs 86 and drain through the drain pipe 92 so that dehumidified air will be delivered into the top outlet opening 70 of the furnace housing 64 and pass into the air duct system, the used air being returned through the top opening 58 in the casing 36.

The air entering through the top opening 58 will then again enter the furnace 12 and the cycle will be repeated so that a continuous flow of cooling air will be delivered through the duct system of the dwelling and the temperature within the dwelling will be correspondingly reduced. It will be appreciated that the air flowing through the opening 70 has been gradually cooled, and not refrigerated, so that no chilling blasts of air will be felt within the dwelling but instead, a constant even flow of cooling air will obtain.

What is the hot water tap line 66 in the winter setting of the system is the cold water tap for summer operation; and the cold water tap line 98 in the winter setting becomes the hot water tap line for summer operation.

In order to insure a continuous flow of cold water from the cold water supply line 48 to the heat exchanger 68, the tap line 66 can be opened at any one of various points and water drawn therefrom and utilized for various purposes, such as watering the lawn, ordinary washing and toilet facilities, cooking, etc. Hence, water flowing through the heat exchanger can be utilized for some purpose, so that waste of this water can be materially reduced.

While there is shown and described the preferred embodiment of the invention, it is to be understood that the structure is susceptible to change and modification within the practicability of the invention and therefore should be limited only by the scope of the claims appended hereto.

What is claimed is:

1. In combination, a hot air furnace comprising a housing partitioned to provide a main air heating compartment and an air preheating compartment, said main air heating compartment having a hot air outlet opening adapted to be connected to the inlet of a distributing duct system, a fire pot within said main air heating compartment, a water jacket in said fire pot, a casing positioned within said air preheating compartment, a conduit connecting said casing in communication with said fire pot to receive gases of combustion from said fire pot and convey same into said casing, said air preheating compartment having a return air inlet adapted to be connected to the outlet of a distributing duct system, blower means for forcing air from the air preheating compartment to the main air heating compartment, a vertical water preheating coil in said casing in heat exchange relation to the gases of combustion entering said casing through said conduit, said preheating coil having an upper end and a lower end, an external cold water supply connected to said upper end of the preheating coil, the lower end of the preheating coil being connected to said water jacket, a heat exchanger in the furnace housing above said firepot and beneath said hot air outlet, said heat exchanger comprising a vertical coil having a top convolution and a bottom convolution, an electric pump equipped pipe leading from said water jacket to said bottom convolution, a storage tank mounted at a side of the furnace housing to which said top convolution is connected, a tap line connected to said storage tank, and means connecting said storage tank to said water jacket.

2. In combination, a hot air furnace comprising a housing partitioned to provide a main air heating compartment and an air preheating compartment, said main air heating compartment having a hot air outlet opening adapted to be connected to the inlet of a distributing duct system, a fire pot within said main air heating compartment, a water jacket in said fire pot, a casing positioned within said air preheating compartment, a conduit connecting said casing in communication with said fire pot to receive gases of combustion from said fire pot and convey same into said casing, said air preheating compartment having a return air inlet adapted to be connected to the outlet of a distributing duct system, blower means for forcing air from the air preheating compartment to the main air heating compartment, a vertical water preheating coil in said casing in heat exchange relation to the gases of combustion entering said casing through said conduit, said preheating coil having an upper end and a lower end, an external cold water supply connected to said upper end of the preheating coil, the lower end of the preheating coil being connected to said water jacket, a heat exchanger in the furnace housing above said firepot and beneath said hot air outlet, said heat exchanger comprising a vertical coil having a top convolution and a bottom convolution, an electric pump equipped pipe leading from said water jacket to said bottom convolution, a storage tank mounted at a side of the furnace housing to which said top convolution is connected, a tap line connected to said storage tank, means connecting said storage tank to said water jacket, said furnace firebox having an outlet flue pipe entering said casing below the water preheating coil therein, and said casing having a flue connection adapted to be connected to a flue.

References Cited in the file of this patent
UNITED STATES PATENTS

| | | |
|---|---|---|
| 1,452,249 | Miller | Apr. 17, 1923 |
| 1,779,714 | Schmidt | Oct. 28, 1930 |
| 2,029,574 | Knudsen | Feb. 4, 1936 |
| 2,089,367 | Harbers | Aug. 10, 1937 |
| 2,096,286 | Lord et al. | Oct. 19, 1937 |
| 2,129,202 | Drewry | Sept. 6, 1938 |
| 2,130,894 | Muir | Sept. 20, 1938 |
| 2,190,998 | Somers | Feb. 20, 1940 |
| 2,476,018 | Young et al. | July 12, 1949 |
| 2,482,746 | Crozier | Sept. 27, 1949 |
| 2,533,692 | Rice | Dec. 12, 1950 |
| 2,573,364 | Scharff | Oct. 30, 1951 |